Aug. 20, 1935.  R. V. R. SILL  2,011,656

BUCKET DUMPING APPARATUS

Original Filed April 15, 1932   3 Sheets-Sheet 1

INVENTOR
Richard V. R. Sill
BY
Arthur H. Serrell Jr.
his ATTORNEY

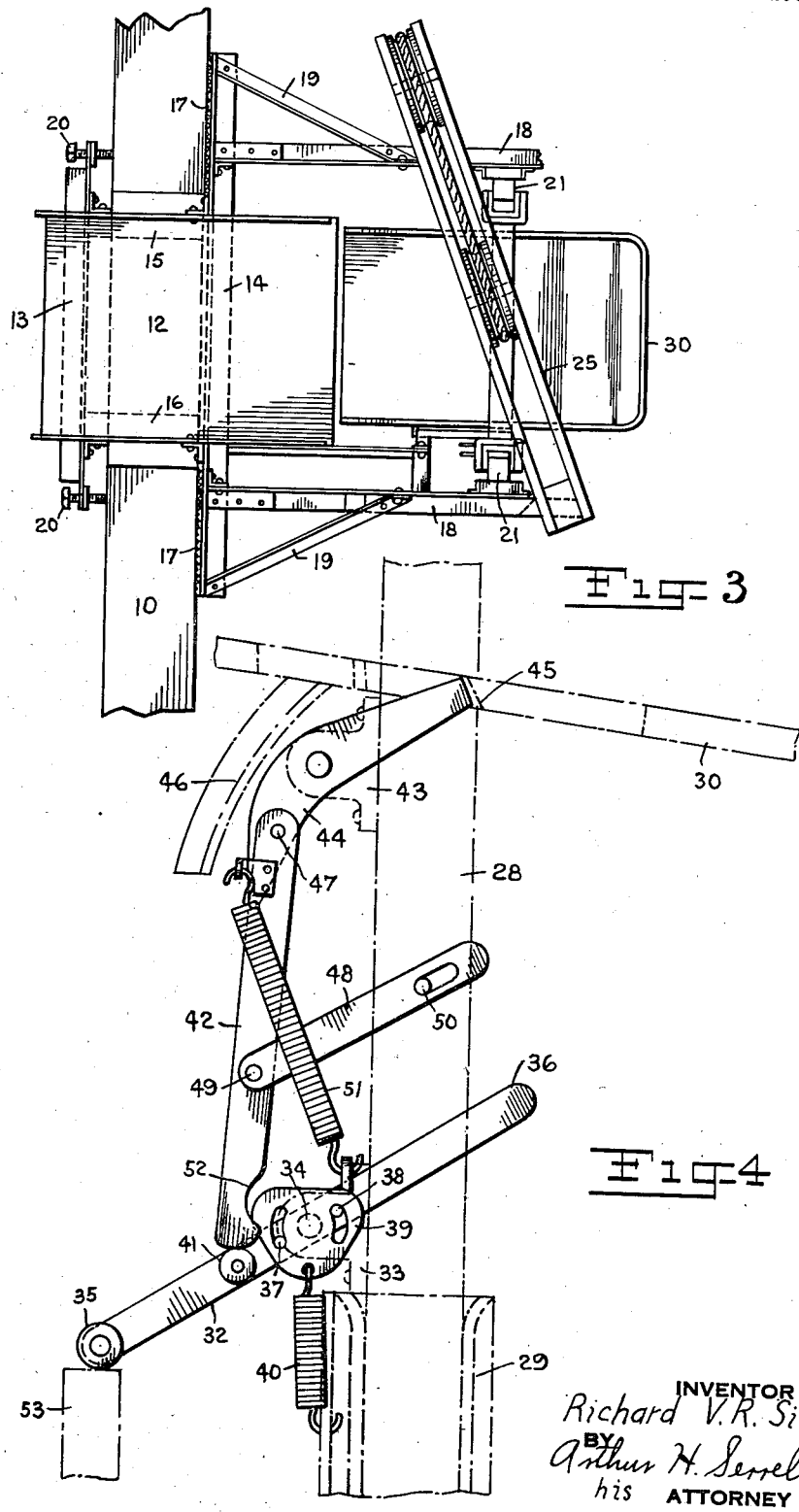

Aug. 20, 1935.                R. V. R. SILL                 2,011,656
                        BUCKET DUMPING APPARATUS
                Original Filed April 15, 1932    3 Sheets—Sheet 3

INVENTOR
Richard V. R. Sill
BY
Arthur H. Serrell Jr.
his ATTORNEY

Patented Aug. 20, 1935

2,011,656

UNITED STATES PATENT OFFICE 2,011,656

BUCKET DUMPING APPARATUS

Richard V. R. Sill, Newark, N. J., distributed by court order to Lucie E. Sill, widow Application April 15, 1932, Serial No. 605,432
Renewed January 8, 1935

8 Claims. (Cl. 214—120)

This invention relates in general to bucket dumping apparatus and more particularly to the automatic operation thereof. In the construction or alteration of buildings of a relatively large number of floors, it is important that facilities be provided for the economical and speedy transport of materials from a dispensing point which is ordinarily on the ground, to the location in that part of the building at which the same are needed. It is also of paramount importance, in constructing such an apparatus, that the dumping bucket be made operative at any flooring level at which material may be desired and not be confined in operation as at present to delivering loads of material to a particular floor only. One of the primary objects of the present invention is to construct an apparatus of this type employing buckets which will accomplish the aforesaid function under the control of the operator.

Another object of the invention is to provide an apparatus of this character which may be utilized either exteriorly or interiorly of the building, when the side walls have been erected and the floors roughly laid out, to obviate the necessity for erecting temporary exterior towers and to reserve the space for shafts in the interior of the building for the purpose that they are designed for. The apparatus is particularly suitable and preferably adapted to carry and transport from one place to another the building materials necessary for the interior finish of the walls and the surfacing of the floors.

The invention also contemplates the utilization of a novel outrigger construction secured to the window casements on the respective floors and forming a framework nucleus for receiving the vertical guides, which confine the movement of the dumping bucket in a predetermined path.

Still another object of the invention is to provide pivotally positioned conveying chutes at the various flooring levels cooperating with the dump bucket to facilitate its return to a normal upright position after the dumping operation and also providing a means for readily receiving the contents of the bucket and conveying the same to the interior of the building without the assistance of manual labor.

Another object is to provide a means at each flooring level whereby the dumping bucket may be operated to deliver its load, said means cooperating with a mechanism associated with the bucket to accomplish this function under the control of the operator only at the particular floor on which the materials are desired, and otherwise remain operatively ineffective by the movement of the bucket along the guideway provided for the same.

The invention further contemplates the provision of a trip co-operating mechanism upon the dump bucket simultaneously operative to release a catch holding the bucket in a normal upright position and to urge the bucket to a tilted position.

My invention further includes other objects, advantages and novel features of design, construction and arrangement hereinafter more particularly referred to and which will be apparent from the accompanying drawings illustrating an embodiment of the invention in its preferred form.

In the drawings:

Fig. 3 is a plan view of the assembled device.

Fig. 4 is a detailed side elevation of the bucket tilting mechanism illustrating the position of the same with respect to one of the tripping devices immediately prior to the dumping operation.

Figures 1, 2:
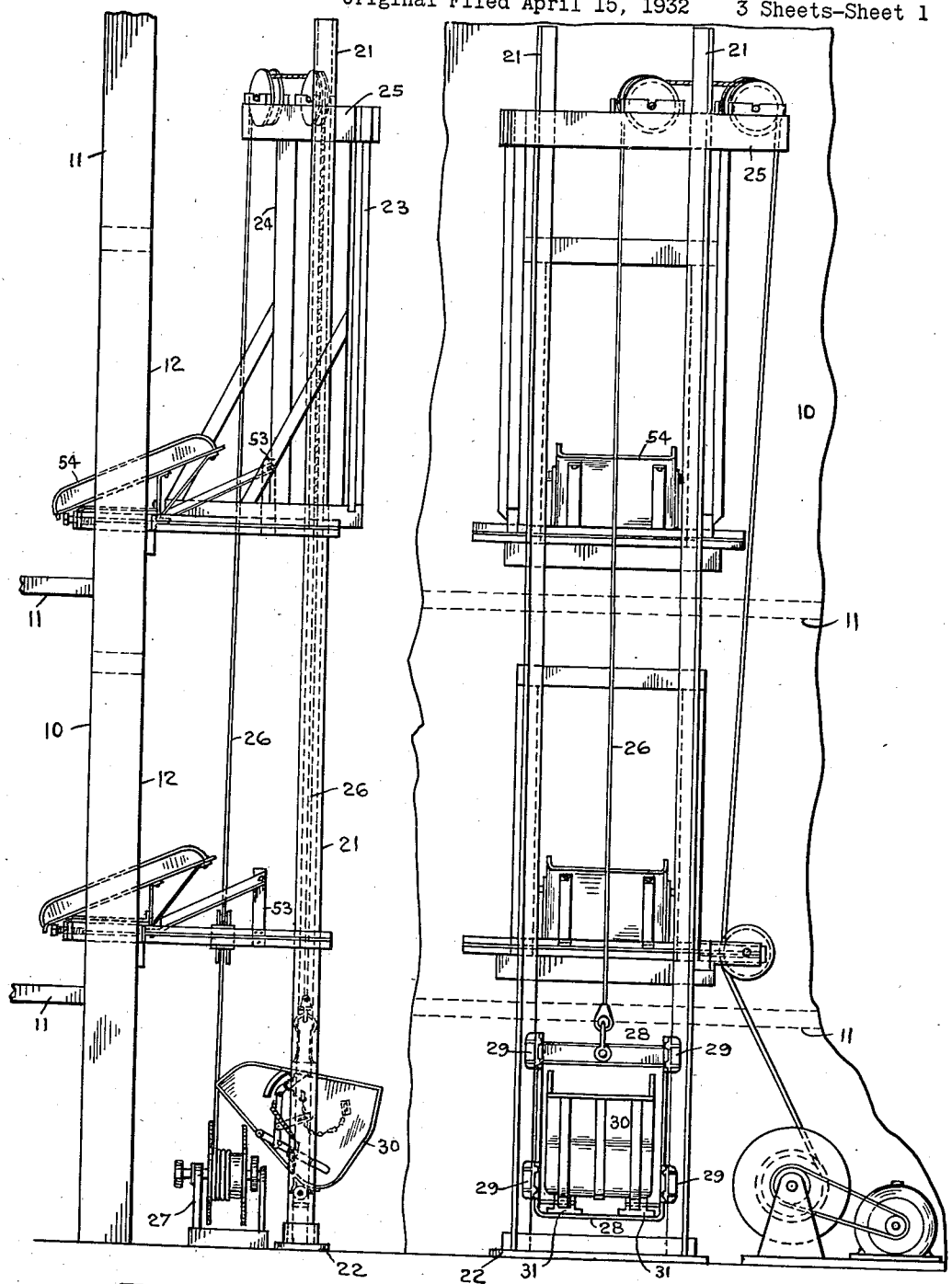
Fig. 1 is a side elevation illustrating the apparatus made in accordance with the present invention in assembled relationship.
Fig. 2 is a front elevation of the apparatus as shown in Fig. 1.

Referring more particularly to Figures 1 to 3 inclusive, the apparatus made in accordance with the present invention includes an outrigger framework, which is removably secured to the wall of a building under construction. The outriggers are located one above another on the respective floor levels and are positioned at a point to preferably extend exteriorly of the side walls of the building. Referring to Figs. 1 and 3, the side wall of a building is indicated at 10, floor levels at 11 and the window casements defining openings in the side walls at 12. For purposes of illustration and in order to eliminate unnecessary duplication, the assembled views of the apparatus in the drawings show outriggers only on the second and third floors of a three story building although obviously the apparatus is adaptable for use on buildings of any elevation simply by providing additional outriggers to extend the apparatus to the required height.

The outriggers are uniformly constructed to be fastened to the sides of the window casing and include an interiorly disposed crossbar 13 suitably connected to a member 14 arranged parallel to the same on the exterior of the building by means of the arms 15 and 16, which extend across the window. The interior face of the member 14 is provided with a cushioning material, such as rubber, as indicated at 17, to prevent the defacement of the finished exterior side walls of the building. Guideway retaining arms 18 extend perpendicularly from the member 14 and are braced in position by means of the arms 19. Each of the outriggers are firmly secured in place in their respective window casings by means of turn bolts 20, the ends of which are moved to take a position against the unfinished interior wall surface. The member 14 of the outrigger frame is sufficiently wide to permit the proper bracing of the extending arms 18 and also to space these arms wide enough apart to retain a parallel, vertical guideway of a breadth to accommodate a bail with a dumping bucket substantially corresponding in width to the window openings. The interior end faces of the arms 18 are constructed to receive vertical guide pieces 21, so that a set of guide rails substantially parallel to the wall of the building are formed to extend to any desired elevation above the ground. The rails usually extend to the surface of the ground and are adapted to fit into a base holding member 22 to prevent the same from spreading or becoming imbedded in the ground.

A headpiece is positioned above the outrigger at the highest elevation in the building, the same being supported on legs 23 and 24, which are suitably secured and braced to a base member as shown in Fig. 1 of the drawings. The leg 23 is set farther away from the side of the building than the leg 24 so that the headpiece 25 is supported at an angle to the building, Fig. 3, thus permitting the guide rails 21 to pass on opposite sides of the headpiece and consequently obviate the necessity of cutting the guide rails to an exact length to correspond with the position of the headpiece. The usual pulleys are located in the head piece and are adapted to guide a cable 26, which is connected to a bail containing a pivotally positionable bucket as will hereinafter be more particularly described. A hoisting mechanism is indicated at 27, the same providing means for actuating the bail through the medium of the cable 26.

The bail indicated at 28 is provided with shoes 29 which cooperate with the vertical guide rails 21 to confine the movement of the same in an upwardly or a downwardly direction. The bucket for transporting the building material is indicated at 30 and is suitably mounted to pivot with respect to the bail 28 by being hinged to the upper surface of the lower cross piece of the same as shown at 31.

Referring particularly to Fig. 4, the bucket dumping mechanism is illustrated in detail, the mechanism being arranged on the side of the bail 28 adjacent the bucket. A trip cooperating lever is indicated at 32, the same being pivotally secured to an offset bearing member 33 on the side of the bail. The pivot point of the lever 32 with respect to the bearing 33 is indicated at 34. One end of the lever 32 is provided with a roller 35, which slidingly cooperates with the side of the trip devices at each flooring level during the movement of the bail in either direction along the guide way. The other end of the lever extends, as shown at 36, so as to act as a counterbalance to the weight of the roller 35. Spaced at equal radial distances from the pivot point 34 on the lever 32 are pins 37 and 38, which are adapted to engage curved slotted openings in a plate 39. A spring 40 or other energized means is utilized to impart its energy through the plate 39 by means of either of the pins 37 or 38 cooperating with either of the respective end surfaces of the slots to maintain the counterweighted lever 32 in a desired angular position. As shown in Fig. 4, the force is transmitted through the pin 38 acting against the end surface of the slot in the plate 39, the same tending to pull the lever 32 in a clockwise direction. In this particular setting of the trip cooperating lever the spring 40 functions to normally retain a roller 41 against the undersurface of an arm 42 of the bucket dumping mechanism. During the upward movement of the bail along the guideway, the roller 35 on the end of the lever 32 may cooperate with the trip devices on successive flooring levels to move the same temporarily in a counterclockwise direction, thereby momentarily lowering the roller 41. It will be understood, however, that as soon as the roller 35 leaves the side of one of the trip devices, the spring 40 moves the lever 32 so that the roller 41 returns to its normal initial operative position. It will be now apparent that in the upward motion of the bail, any number of trip devices may be passed by the trip cooperating mechanism without effecting a bucket dumping operation.

The bucket dumping mechanism preferably comprises, in part, a curved lever pivotally mounted to a bearing member 43 secured to the side of the bail. The lever is indicated at 44, one end of the same cooperating with a lug 45 on the side of the bucket to normally retain it in an upright position. A curved lateral shoulder 46 extending from the side of the bucket is located adjacent the opposite end of the lever 44. The movement of the lever in a clockwise direction about its pivot point simultaneously lowers the end of the same cooperating with the lug 45 and urges the bucket by cooperation with the shoulder 46 to assume a dumping position. The arm 42 is pivotally connected to the lever 44 as indicated at 47. One end of an arm 48 also makes a pivotal contact with the arm 42 as shown at 49. The opposite end of the arm 48 is provided with a longitudinal slot, which cooperates with a pin 50 located on the interior face of the bail 28. The spring 51 secures the link mechanism composed of the lever 44 and arms 42 and 48 in a normal inoperative position. The inner face of the arm 42 is curved as indicated at 52 to provide a recess to retain the roller 41 of the lever 32 after the bucket dumping operation as will hereinafter be more particularly described. The slot in the arm 48 permits an outward movement of the arm 42 during the operation of the bucket dumping link mechanism so that the roller 41 will assume a position in the recess 52 provided for the same.

Each of the outriggers include a trip 53 vertically mounted thereon and suitably braced as clearly illustrated in the drawings, Fig. 1. The trip elements are located in the path of movement of the roller 35 associated with the end of the trip cooperating lever 32 so that during the movement of the bail in either direction, the lever must adjust itself to permit the passage of the roller along the surface of the trip adjacent the guides.

Conveyor chutes for receiving the material from the bucket are indicated at 54. Each floor level is provided with an inclined chute, which is adapted to rest on the outrigger frame members 13 and 14 by action of gravity, the chute extending from the interior of the building to a point exteriorly thereof to cooperate with the bucket during the dumping operation. The undersurface of the inwardly disposed end of the chute is curved as indicated at 55, Fig. 5, to pivotally retain the chute to the edge of the crossbar 13. In the event that the bucket be accidentally, or inadvertently raised while still in a dumping position at any floor level past the next adjacent floor above, the bucket will raise the exterior end of the pivotable chute, which will fall back into a normal position on the outrigger again after the bucket has moved out of the way thus preventing any damage to the apparatus by reason of the negligence of the operator.

A chain 56 or other suitable means connecting the bucket and the bail is utilized to limit the tilting position of the bucket during the dumping operation.

In the operation of the apparatus, the initial position of the bucket after loading is shown in Fig. 1. The operator of the hoist mechanism 27 elevates the bail and bucket along the guide rails 21 adjacent the floor level at which the contents of the bucket are desired. It will be noted that in the loading position of the bucket the roller 41 is retained in the recess 52 of the bucket dumping link system arm 42. The action of the spring 40 through the plate 39 and pin 37 yieldingly retains the lever 32 in this position, Fig. 1, the dump actuating and locking lever 44 being incapable of movement as the same is firmly retained in an inoperative position by the spring 51 as long as the roller 41 is located in the recess 52.

Upon the movement of the bail 28 in an upward direction, when it is desired to dump the bucket, for example on the second floor of the building, the roller 35 of the lever 32 will strike the undersurface of the trip 53 located on the first outrigger. This action moves the lever in a counterclockwise direction withdrawing the roller 41 from the recess in the arm 42. The roller 35 moves along the adjacent surface of the trip 53 until the bail moves above the trip. The spring 40 then becomes operative to move the lever 32 so that the roller 41 rests against the undersurface of the arm 42 in an operative position. In passing the trip located on the second floor, the roller 41 is lowered temporarily from its operative position due to the compensating movement of the lever 32 under the guidance of the roller 35. As soon as the bail is elevated above the trip, the spring 40 immediately operates to swing the lever 32 so that the roller 41 assumes its normal operative position. It will be apparent from the foregoing that the trip devices on any number of outriggers may be passed during the upward movement of the bail without effecting a dumping operation of the bucket.

Figure 6:
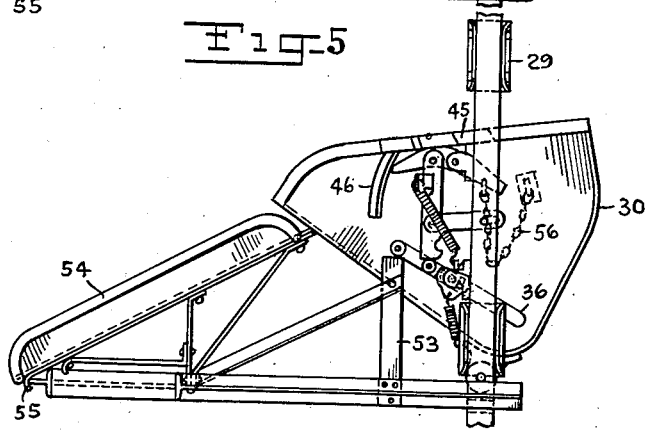
Figure 7:
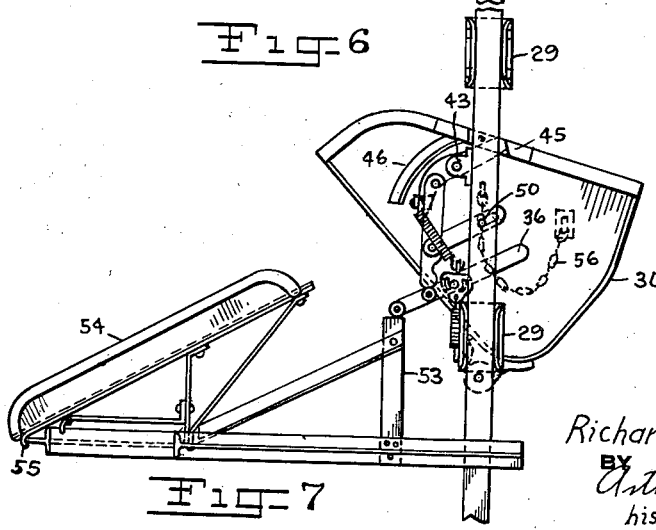

After the operator has raised the bail above the trip at the floor the material is to be delivered to, the hoist mechanism is stopped. The bail is then moved in a downward direction, the roller 35 of the lever 32, Fig. 7, cooperating with the upper surface of the trip 53 moves the lever in a clockwise direction. The roller 41 of the lever 32 exerts an upward thrust along the arm 42, Fig. 6, moving the actuating and release lever 44 to tilt the bucket, in the start of the dumping operation, against the adjacent end of the conveyor chute. The operator then raises the bail, Fig. 7, so that the pivotable bucket moves to assume the greatest tilting angle afforded the same by the chain 56 to complete the dumping operation. The material from the bucket slides along the surface of the inclined chute and is delivered to the interior of the building, thereafter being transported or handled in the usual manner.

Figure 5:
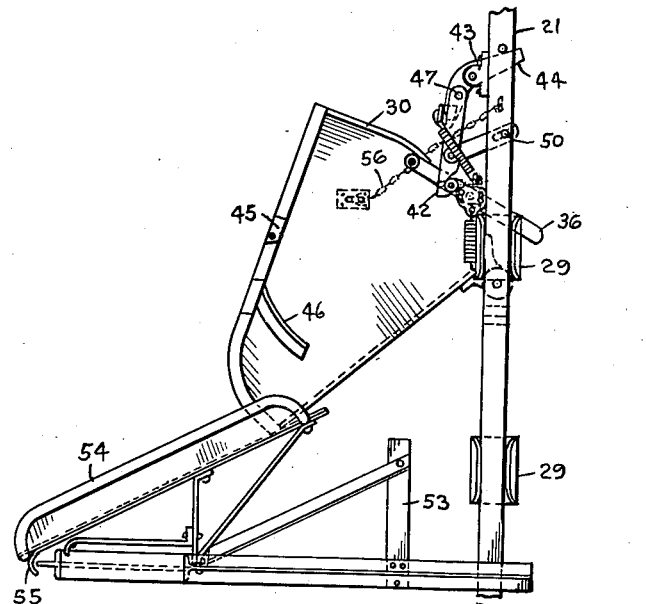
Figs. 5, 6 and 7 show various detailed positions of the dumping bucket with respect to the conveyor chute and trip device during the cycle of its operation.

During the bucket dumping operation the arm 42 of the link system moves outwardly toward the side of the building by reason of the flexibility afforded the same by the connecting slotted arm 48 so that the lever 32 traveling in a clockwise direction under the influence of the roller 35 takes a position, Fig. 5, in which the roller 41 is located in the recess of the arm 42. The lever 44 is returned to its normal position by the spring 51 as clearly shown in this figure of the drawings while the bucket is in the process of delivering its load.

After the finish of the dumping operation, the operator of the hoist mechanism 27 lowers the bail. The bucket cooperating with the end of the conveyor chute is returned to its initial upright position on the bale, the lug 45 sliding over the upper surface of the lever 44 until the same reaches its normal locking position adjacent the end of the lever. In the downward movement of the bale the roller 35 on the lever 32 contacts the trip on the outriggers at the lower floor levels, the lever moving in a clockwise direction when such contact takes place and being returned to its inoperative position with the roller 41 in the recess of the arm 42 by the action of the spring 40, through the plate 39 and pin 37. The bail is thus returned to a position for reloading the bucket.

Inasmuch as many changes could obviously be made in the construction of the apparatus, herein described and many apparently widely different embodiments of my invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:

1. In a device of the character described, in combination, a dump bucket pivotally mounted on a bail adapted for vertical movement along a guideway, a plurality of trip devices located at different elevations with respect to the path of movement of the bail, mechanism associated with said bail normally locking the bucket in an upright position and operative to simultaneously release the bucket to dump and urge it to a tilting position, a lever cooperating with said trip devices and associated with said mechanism forming means upon the initial downward movement of the bail by the operator to cause a dumping operation of the bucket at the desired elevation.

2. In a device of the character described, a series of outriggers arranged on successive floors of a building and removably secured to the window casements therein, a pair of exterior arms on each outrigger retaining on the inner faces of the same vertical rails forming a guideway therebetween substantially parallel to the wall of the building, an inclined conveyor chute associated with the outriggers at each floor level, a bail movable along the guideway having a tiltable bucket mounted thereon, the exterior edge of the chute cooperating with the bucket to return the same to an upright position on the bail when it is moved down the guideway after the dumping operation.

3. In a device of the character described, in combination, a dump bucket pivotally mounted on a bail adapted for vertical movement along a guideway, a plurality of fixed trip devices located at different elevations with respect to the path of movement of the bail, means for retaining said bucket in an upright position, and bucket dumping mechanism located on the bail including therein a single trip cooperating lever movable in the path of all the fixed trip devices, said mechanism being adapted to simultaneously release the bucket retaining means and to urge the bucket to a dumping position at a desired elevation under control of the operator by changing the direction of cooperation of the lever and trip at that level, and being operatively unaffected by the cooperation of the lever and trip devices at lower elevations during the travel of the bail.

4. In a device of the character described, a series of outriggers arranged on successive floors of a building and removably secured to the window casements therein, a pair of exterior arms on each outrigger retaining on the inner faces of the same vertical rails forming a guideway therebetween substantially parallel to the wall of the building, a bail movable along the guideway having a tiltable bucket mounted thereon, inclined conveyor chutes pivotally mounted upon the outriggers of each floor level, adapted to transfer the material in the bucket when tilted into the building, said chutes facilitating the upward passage of the bail in the event the bucket is inadvertently in a tilting position.

5. In a device of the character described, a series of outriggers arranged on successive floors of a building, vertical rails connected to the extending arms of the outriggers forming a guideway therebetween, a bail movable along the guideway having a tiltable bucket mounted thereon, inclined conveyor chutes pivotally mounted upon the outriggers of each floor level adapted to facilitate the upward passage of the bail in the event the bucket is inadvertently in a tilting position.

6. In a device of the character described, a dump bucket pivotally mounted on a bail adapted for vertical movement along a guideway, a plurality of separate trip devices in vertical alignment located at different elevations adjacent the path of movement of the bail, and mechanism associated with the bail operative upon the initial downward movement of the same to cooperate with a trip device to urge the bucket to a dumping position at the desired elevation, said mechanism being operatively unaffected by the other trip devices during the travel of the bail.

7. In a device of the character described, in combination, a dump bucket pivotally mounted on a bail adapted for vertical movement along a guideway, plurality of separate fixed trip devices in vertical alignment located at different elevations adjacent the path of movement of the bail, mechanism associated with said bail operative to urge the bucket to a dumping position, a lever cooperating with said trip devices and associated with said mechanism forming means upon the initial downward movement of the bail by the operator to cause a dumping operation of the bucket at the desired elevation, said mechanism being operatively uneffected by the other trip devices during the travel of the bail.

8. In a device of the character described, in combination, a dump bucket pivotally mounted on a bail adapted for vertical movement along a guideway, a plurality of separate fixed trip devices in vertical alignment located at different elevations with respect to the path of movement of the bail, bucket dumping mechanism located on the bail and including therewith a single trip cooperating lever movable in the path of all the fixed trip devices, said mechanism being adapted to urge the bucket to a dumping position at a desired elevation under control of the operator by changing the direction of cooperation of the lever and trip at that level, and being operatively unaffected by the cooperation of the lever and trip devices at lower elevations during the travel of the bail.

RICHARD V. R. SILL.